US012779358B2

(12) United States Patent
Vitale et al.

(10) Patent No.: US 12,779,358 B2
(45) Date of Patent: Nov. 3, 2026

(54) VACUUM EVAPORATION UNIT

(71) Applicants: Francesco Vitale, Grumolo Delle Abbadesse (IT); Vincenzo Longo, Portogruaro (IT)

(72) Inventors: Francesco Vitale, Grumolo Delle Abbadesse (IT); Vincenzo Longo, Portogruaro (IT)

( * ) Notice: Subject to any disclaimer, the term of this patent is extended or adjusted under 35 U.S.C. 154(b) by 109 days.

(21) Appl. No.: 18/856,764

(22) PCT Filed: May 19, 2023

(86) PCT No.: PCT/IB2023/055181

§ 371 (c)(1),
(2) Date: Oct. 14, 2024

(87) PCT Pub. No.: WO2023/223280

PCT Pub. Date: Nov. 23, 2023

(65) Prior Publication Data

US 2025/0249377 A1 Aug. 7, 2025

(30) Foreign Application Priority Data

May 20, 2022 (IT) ........................ 102022000010538

(51) Int. Cl.

| | |
|---|---|
| ***B01D 1/28*** | (2006.01) |
| ***B01D 3/00*** | (2006.01) |
| ***B01D 3/10*** | (2006.01) |
| ***B01D 5/00*** | (2006.01) |
| ***B01D 53/18*** | (2006.01) |
| ***C02F 1/04*** | (2023.01) |
| ***C02F 1/06*** | (2023.01) |
| *C02F 101/16* | (2006.01) |

(52) U.S. Cl.

CPC ............... *B01D 3/007* (2013.01); *B01D 1/28* (2013.01); *B01D 1/284* (2013.01); *B01D 1/2846* (2013.01); *B01D 1/2856* (2013.01); *B01D 3/10* (2013.01); *B01D 3/106* (2013.01); *B01D 5/006* (2013.01); *B01D 5/0075* (2013.01); *B01D 53/18* (2013.01); *C02F 1/041* (2013.01); *C02F 1/06* (2013.01); *C02F 2101/16* (2013.01); *C02F 2303/10* (2013.01)

(58) Field of Classification Search

CPC .............................................. B01D 1/28–2896
USPC ........................................................ 159/27.2
See application file for complete search history.

(56) References Cited

U.S. PATENT DOCUMENTS

| | | | | | |
|---|---|---|---|---|---|
| 1,440,026 | A * | 12/1922 | Nilsson | B01D 1/2818 516/122 |
| 3,480,515 | A * | 11/1969 | Goeldner | B01D 1/2818 376/310 |
| 2018/0305221 | A1 | 10/2018 | Yin et al. | |

OTHER PUBLICATIONS

International Search Report and Written Opinion dated Sep. 12, 2023, issued in PCT Application No. PCT/IB2023/055181, filed May 19, 2023.

* cited by examiner

*Primary Examiner* — Jonathan Luke Pilcher
(74) *Attorney, Agent, or Firm* — Workman Nydegger

(57) ABSTRACT

A vacuum evaporation unit includes: a vacuum chamber for the containment of a liquid solution (SL) to be treated, including in turn a lower part for collecting the liquid solution and an upper part for a rising vapour (V) developing from the liquid solution; a condensation chamber, where the condensation of the vapour (V) generated by the boiling of the liquid solution (SL) takes place; a heat exchanger configured to bring about a heat exchange between the vapour (V) of the liquid solution (SL) and the liquid solution (SL) itself; a first transfer mechanism configured to conduct the vapour (V) from the upper part of the vacuum chamber to the heat exchanger. This unit includes a washing tower configured for the countercurrent treatment of the vapour (V) exiting from the vacuum chamber with a liquid absorption solution (SA).

8 Claims, 5 Drawing Sheets

VACUUM EVAPORATION UNIT

BACKGROUND OF THE DISCLOSURE

1. The Field of the Disclosure

The invention concerns a vacuum evaporation unit.

2. The Relevant Technology

So-called 'vacuum evaporators' are nowadays well-known and widespread in the disposal of polluting liquid waste.

Vacuum evaporators are used for concentrating aqueous solutions containing pollutants by evaporating water at low temperature.

By treating a wastewater to be disposed of with a vacuum evaporator, the volume of wastewater to be disposed of is significantly reduced, allowing the recovered distilled water to be reused and returned to the source users.

In general, vacuum evaporators make it possible to totally recycle the water used in production processes, leading to a drastic reduction in the amount of wastewater to be sent for disposal, reducing disposal costs and saving on water supply.

In some cases, such as wastewater from galvanic bath washes and recoveries, it is possible to reuse the concentrated recovery solution in the treatment baths.

The distillates obtained by vacuum evaporation are often polluted by so-called 'low-boiling' species, which remain in the vapour and cause the quality of the distillate itself to deteriorate, making its use or discharge into the sewage system problematic, resulting in the need for chemical-physical or biological post-treatments that are often costly in terms of both investment and operating costs.

The evaporator is a machine with mechanical vapour compression.

For example, a vacuum evaporator may comprise an evaporation bowl, i.e., a tank, configured to contain a solution in the liquid state to be treated at a certain temperature and at a predefined pressure to lower its evaporation temperature.

The liquid solution to be treated and the vapour of the same solution separate in the evaporation bowl and cross in a heat exchanger, thanks to the forced circulation imposed by corresponding pumping and compression means.

The liquid which evaporates, which is the substance to be filtered and cleaned, is found in the evaporation bowl.

The vapour from this liquid solution is sucked in via a circulation pump and pushed towards a heat exchanger, e.g., a shell-and-tube heat exchanger.

The liquid solution is circulated inside the tubes of the heat exchanger, pushed by a circulation pump that draws it from the bottom of the evaporation bowl.

The outside of the heat exchanger tubes are lapped by vapour from the liquid solution, sucked in by a compressor, which pushes it into the heat exchange chamber where the heat exchanger is located.

The liquid solution passes through the heat exchanger and heats up, exiting the heat exchanger back into the evaporation bowl in the form of a superheated liquid.

Upon entering the evaporation bowl, the superheated liquid solution releases vapour again, thus generating a so-called 'flash' evaporation, i.e., a partial evaporation of the liquid solution.

In the heat exchange chamber, the vapour condenses outside the heat exchanger and releases energy to the solution circulating inside the heat exchanger.

The condensate, or distillate, formed outside the heat exchanger collects at the bottom of the heat exchange chamber and is extracted from there, e.g., with a vacuum pump.

The condensate, or distillate, is made available to the source users from which the liquid solution originated.

Thanks to such a vacuum evaporator, for example, 100 cubic metres of a solution of an oily emulsion, e.g., a water-based release emulsion, are reduced by a factor of 10, i.e., they are reduced to 10 cubic metres, and the recovered distilled water is reused to prepare other release agents.

As mentioned above, the wastewater to be treated may contain pollutants, such as nitrogen in the form of ammoniacal nitrogen.

These low-boiling species distil, i.e., evaporate, together with the vapour formed in the evaporator.

As mentioned, low-boiling species are gases that move together with vapour and are then found in the condensate of the same vapour.

Low-boiling species are water-soluble gases.

The species that are insoluble in water on the other hand, such as CO2, or Nitrogen, are degassed in the vacuum pump and are called 'non-condensables' in technical jargon.

These known vacuum evaporators, although widespread and popular today, are all faced with the major problem of managing the low-boiling species.

SUMMARY OF THE DISCLOSURE

The task of the present invention is that of developing a vacuum evaporation unit able to overcome the mentioned drawbacks and limits of the prior art.

In particular, an aim of the invention is to develop a vacuum evaporation unit capable of breaking down low-boiling pollutants from the vapour phase.

Another aim of the invention is to develop a vacuum evaporation unit capable of recovering low-boiling species so that they are reusable.

A further aim of the invention is to develop a vacuum evaporation unit that can incorporate any vacuum evaporator of the already existing type.

The task as well as the aforementioned objects are achieved by a vacuum evaporation unit according to the claims.

Further characteristics of the evaporation unit are described in the dependent claims.

BRIEF DESCRIPTION OF THE DRAWINGS

The aforesaid task and objects, together with the advantages that will be mentioned hereinafter, are indicated by the description of an embodiment of the invention, which is given by way of non-limiting example with reference to the attached drawings, where.

DETAILED DESCRIPTION OF THE PREFERRED EMBODIMENTS

Figure 1:
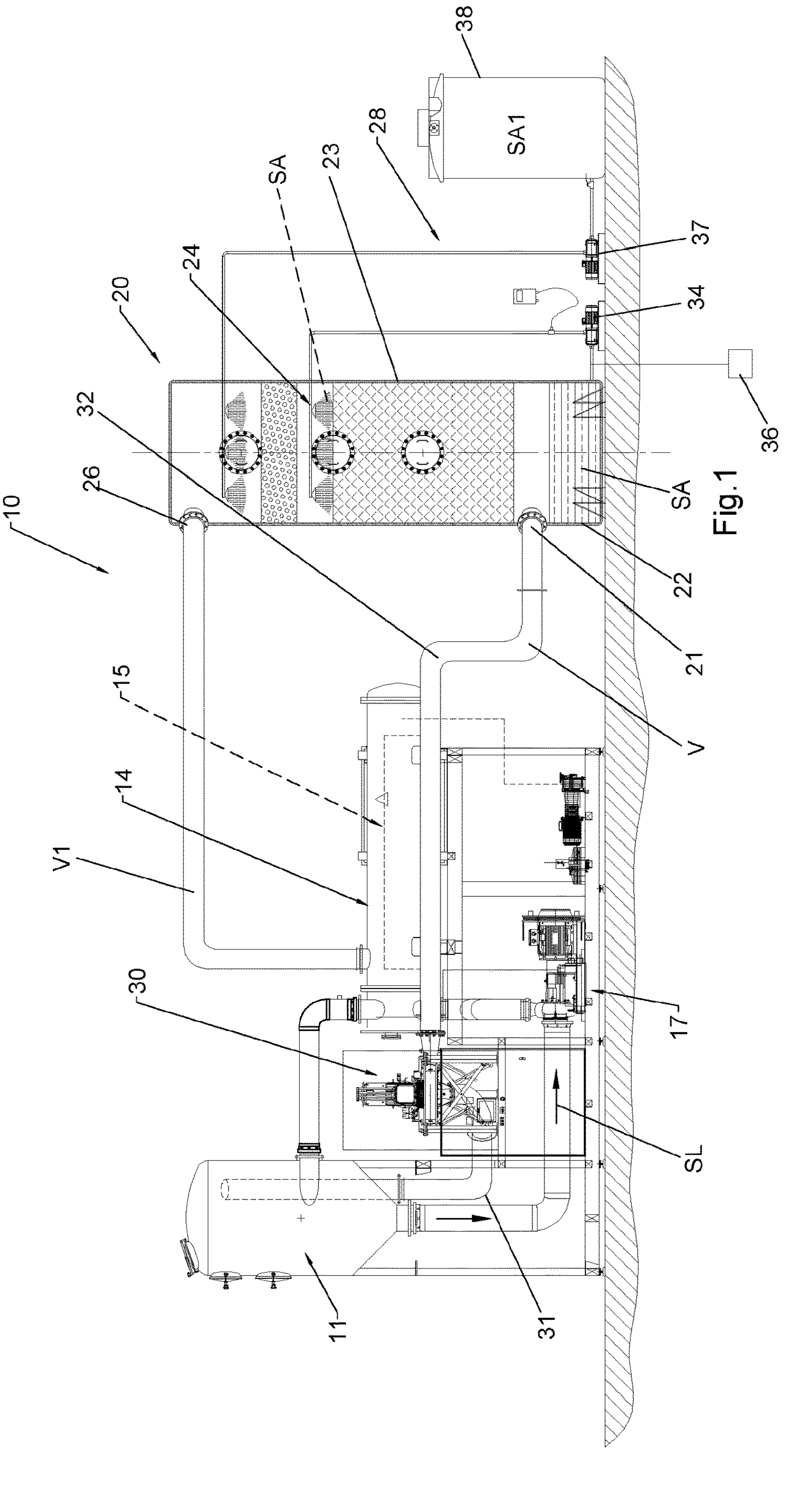
FIG. 1 represents a schematic side view of a vacuum evaporation unit according to the invention.
Figure 2:
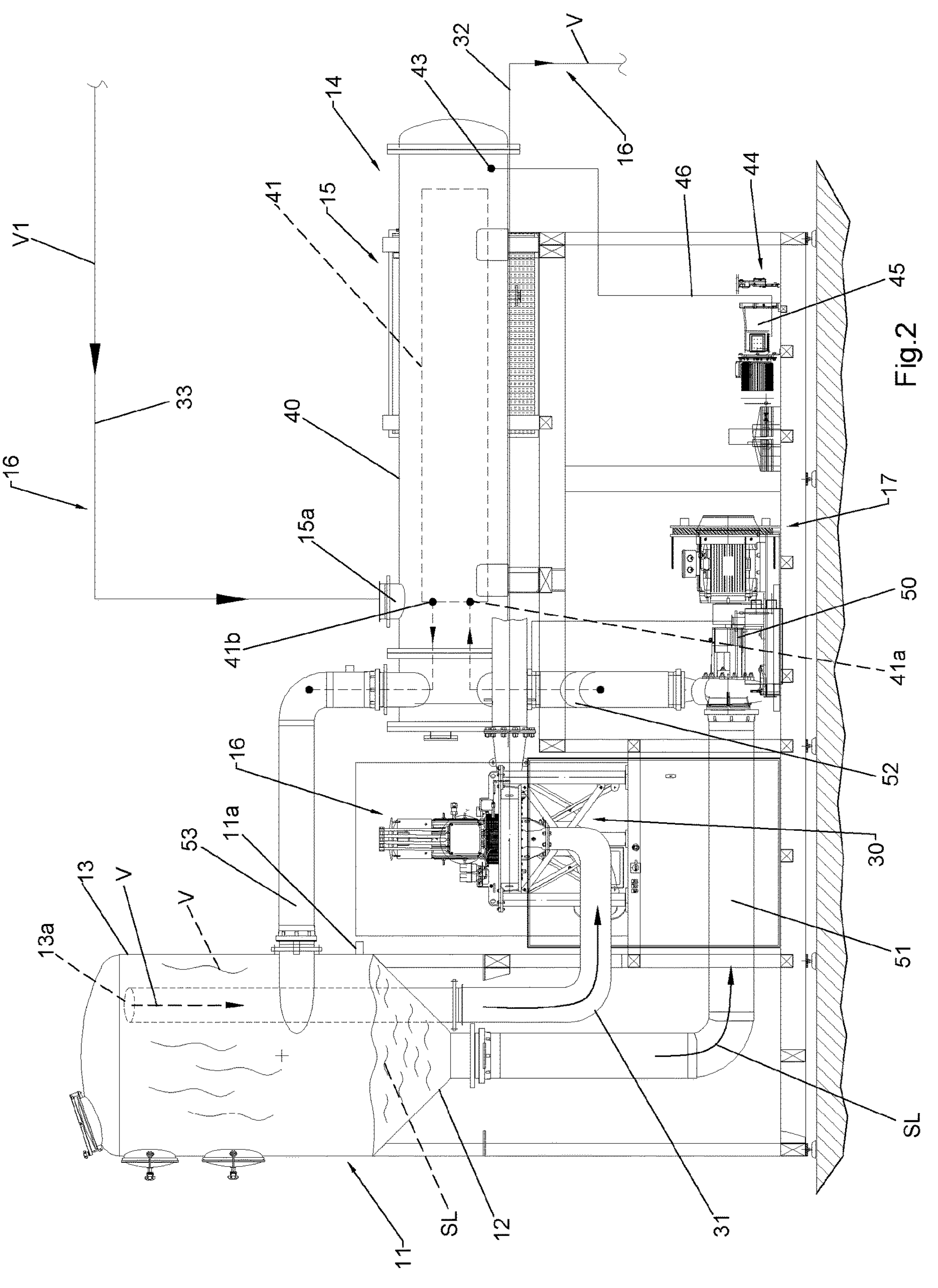
FIG. 2 represents a first part of the evaporation unit according to the invention.
Figure 3:
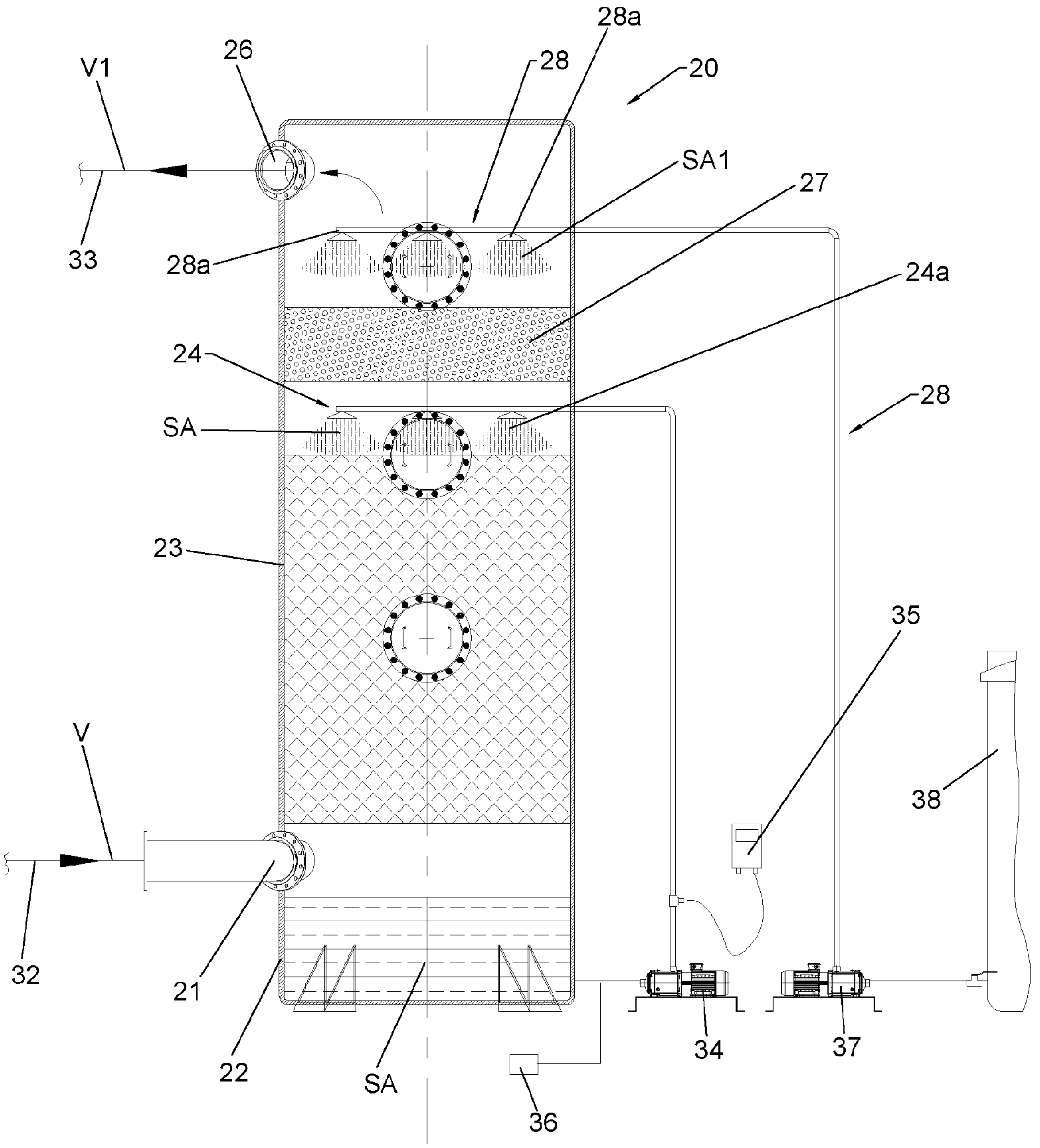
FIG. 3 represents a second part of the evaporation unit according to the invention.
Figure 4:
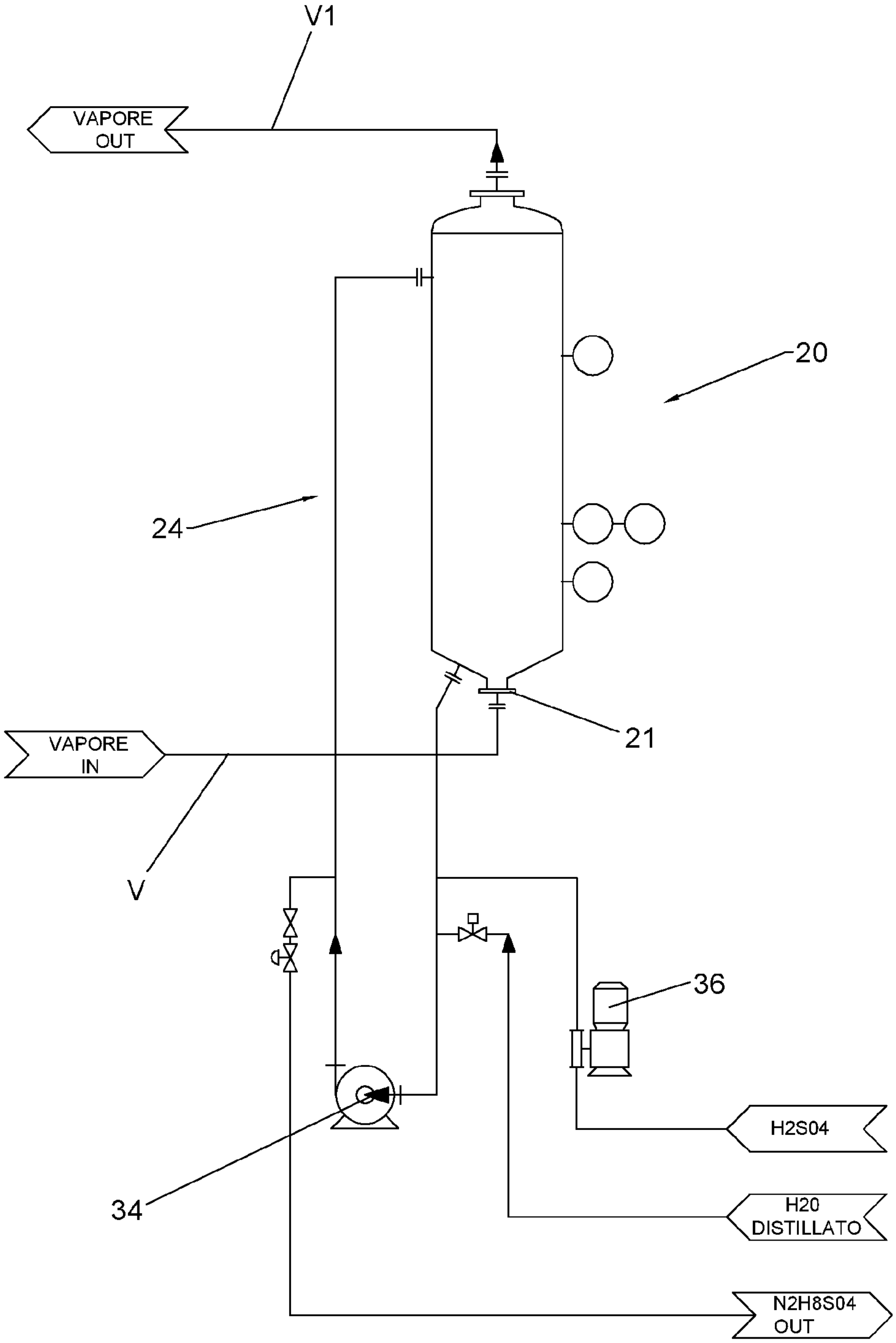
FIG. 4 represents a diagram of the second part of the evaporation unit according to the invention.

With reference to the cited figures, a vacuum evaporation unit according to the invention is indicated as a whole by number 10.

This vacuum evaporation unit 10 includes:

- a vacuum chamber 11 for the containment of a liquid solution SL to be treated; this vacuum chamber 11, which in industry jargon is also known as an 'evaporation bowl', comprises in turn a lower part 12 for collecting the liquid solution and an upper part 13 for a rising vapour V developing from the liquid solution SL;
- heat exchange means 15 configured to determine heat exchange between the vapour V of the liquid solution SL and the liquid solution SL itself;
- a condensation chamber 14 communicating with the heat exchange means 15 and in which the condensation of the vapour V occurs as a result of heat exchange with the liquid solution SL;
- first transfer means 16 configured to conduct the vapour V from said upper part 13 of said vacuum chamber 11 towards said heat exchange means 15.

The vacuum chamber 11 and the heat exchange means 15, as will be described in detail below for the two embodiments of the invention, are operatively communicating with each other so that the liquid solution SL present in the lower part 12 of the vacuum chamber 11 is placed in contact with the aforesaid heat exchange means 15 so as to implement such heat exchange between the vapour V of the liquid solution SL and the liquid solution SL itself, and furthermore the vacuum chamber 11 and the heat exchange means 15 are operatively communicating with each other so that, following said heat exchange, the liquid solution SL, which has undergone this heat exchange, is present in the aforesaid lower part 12.

The peculiarity of the vacuum evaporation unit 10 according to the invention lies in the fact that it comprises a washing tower 20 belonging to said first transfer means 16 and configured for countercurrent treatment of the vapour V exiting the vacuum chamber 11 with a liquid absorption solution SA.

In the embodiment of the vacuum evaporation unit 10 according to the invention, described herein by way of non-limiting example of the invention itself, the washing tower 20 comprises:

- an inlet port 21 for the vapour V exiting from said upper part 13 of said vacuum chamber 11;
- a settling basin 22 for the collection and settling of a liquid absorption solution SA;
- an exchange column 23 configured to operate a countercurrent exchange of matter between said vapour V, ascending, and said liquid absorption solution SA, descending; the exchange column 23 is located above the settling basin 22;
- dispensing means 24 configured to dispense the liquid absorption solution SA diffusely above the exchange column 23;
- an outlet port 26 for said vapour V coming out of said washing tower 20.

The vapour V leaving the washing tower 20 is intended to be a 'washed' i.e., treated, vapour and is referred to for convenience as V1 to distinguish it from the untreated vapour V, which enters the washing tower 20.

The washing tower 20 is connected at the inlet with the upper part 13 of the vacuum chamber 11, and at the outlet with the heat exchange means 15.

The inlet port 21 is connected to said upper part 13 of said vacuum chamber 11 by means of extraction and compression means 30, belonging to said first transfer means 16.

For example, the extraction and compression means 30 comprise a centrifugal compressor, which draws in untreated vapour V from the upper part 13 and pushes it to the inlet port 21 of the washing tower 20.

The first transfer means 16 thus include:

- the extraction and compression means 30;
- a first conduit 31 for the untreated vapour V, configured to connect a vapour outlet port 13*a* with a suction port of the extraction and compression means 30;
- a second conduit 32 for the untreated vapour V, configured to connect the delivery port of the extraction and compression means 30 with the inlet port 21 of the washing tower 20;
- the washing tower 20;
- a third conduit 33 for the treated vapour V1, configured to connect the outlet port 26 of the washing tower 20 with an inlet port 15*a* of the heat exchange means 15, the latter being described in more detail below.

Specifically, in the present embodiment example, the washing tower 20 includes a droplet separator 27 placed above said dispensing means 24.

The droplet separator 27 is also known in the industry as a 'demister'.

The dispensing means 24 comprise, in the present embodiment example, a set of blowers 24*a*.

The dispensing means 24 comprise a recirculation pump 34 configured to suck the absorption solution SA from the settling basin 22 and push it to the blowers 24*a*.

For example, if the vapour V entering the washing tower 20 contains a pollutant including ammonium ions, the absorption solution SA is sulphuric acid.

Such an absorption solution SA, sprayed by the blowers 24*a* onto the vapour V containing ammonium ions, reacts with the latter and returns to the below settling basin 22 in the form of a solution containing ammonium sulphate; the ammonium sulphate can usefully be used as a fertiliser.

The dispensing means 24 also comprise a pH meter 35, configured and positioned to detect the degree of acidity of the absorption solution SA, which is taken from the settling basin 22 to be sent to the blowers 24*a*.

The dispensing means 24 also comprise a top-up pump 36 configured to inject into the absorption solution SA substances useful for re-establishing the established pH level; for example, the top-up pump 36 pumps sulphuric acid into the washing tower 20, which is useful for reacting with the ammonium ions present in the vapour V entering the washing tower 20.

The washing tower 20 may also comprise auxiliary dispensing means 28 configured to dispense a liquid washing and replenishing solution SA1 diffusely above said droplet separator 27.

The auxiliary dispensing means 28 comprise, in the present embodiment example, a series of blowers 28*a*.

The auxiliary dispensing means 28 comprise a tank 38 for the liquid washing and replenishing solution SA1 and an auxiliary recirculation pump 37 configured to suck the liquid washing and replenishing solution SA1 from the tank 38 and push it to the blowers 28*a*.

The exchange column 23 is a filler-type column.

This exchange column 23 is filled with Raschig rings or other similar annular elements.

Raschig rings are cylinders made of ceramic, metal or plastic and are used to increase the surface area available for chemical reactions. They are typically shaped like hollow cylinders, with a diameter equal to the length of the cylinder.

The set of Raschig rings placed in the exchange column 23 thus results in an increase in the surface area available for chemical reactions between the vapour V ascending and the absorption solution SA dispensed by the dispensing means 24 and possibly between the vapour V and the liquid washing and replenishing solution SA1 dispensed by the auxiliary dispensing means 28, if present.

The washing tower 20 comprises a containment tank inside which the settling basin 22, the exchange column 23, the blowers 24*a* of the dispensing means 24, the droplet separator 27 and the blowers 28*a* of the auxiliary dispensing means 28 are defined.

In the present non-limiting embodiment of the invention, the vacuum evaporation unit 10 comprises second transfer means 17 configured to conduct said liquid solution SL from said lower part 12 of said vacuum chamber 11 to said heat exchange means 15.

In the embodiment of the invention described herein by way of non-limiting example of the invention itself, the heat exchange means 15 comprise a tank 40 inside which a heat exchanger 41 is arranged. The condensing chamber 14 is defined inside the tank 40 around the aforementioned heat exchanger 41.

The heat exchanger 41 is connected at the inlet with the second transfer means 17, and at the outlet with the upper part 13 of said vacuum chamber 11.

In particular, the heat exchanger 41 is connected to an intermediate zone of the vacuum chamber 11, above the liquid solution SL and below the vapour outlet port 13*a*, via an outlet conduit 53.

The tank 40 comprises an inlet port, coinciding with the aforementioned inlet port 15*a* of the heat exchanger means 15, connected to said outlet port 26 of said washing tower 20, and at least one outlet port 43 connected to discharge means 44 configured to extract condensate from the bottom of said tank 40.

The discharge means 44 may comprise, for example, a vacuum pump 45 connected to the discharge port 43 via a discharge pipe 46.

The second transfer means 17 comprise, by way of example, a circulation pump 50 connected to the bottom of the vacuum chamber 11 via a loading conduit 51 and connected to an inlet port 41*a* of the heat exchanger 41 via a delivery conduit 52.

The vacuum chamber 11 is to be understood to be connected with vacuum generation means, which are of a type known in themselves and not represented for simplicity's sake.

The liquid solution SL enters the heat exchanger 41 from the inlet port 41*a* at a certain temperature, and exits the heat exchanger 41, at a higher temperature, from an outlet port 41*b* which is connected via the outlet conduit 53 to the intermediate zone of the vacuum chamber 11.

The liquid solution SL is heated in the heat exchanger 41 and returns to the vacuum chamber 11 at a temperature such that the low pressure in the vacuum chamber 11 causes flash evaporation, i.e., partial evaporation.

The vapour V rises towards the mouth 13*a* while the liquid part falls back towards the lower part 12 where the liquid solution SL is collected.

The vacuum chamber 11, also known as an 'evaporation bowl', comprises a tank configured to contain a solution in the liquid state SL to be treated at a certain temperature and at a predefined pressure, the pressure of which is such that its evaporation temperature is lowered.

The liquid solution SL to be treated and the vapour V of the same solution separate in the evaporation bowl and cross in the tank 40 through the heat exchanger 41, thanks to the first transfer means 16, which suck in and compress the vapour V, and to the forced circulation imposed by the second transfer means 17, which pump the liquid solution SL into the heat exchanger 41.

The heat exchanger 41 is, for example, of the shell-and-tube type, but it may be of another type depending on specific technical requirements.

The liquid solution SL is maintained at a pre-determined level in the vacuum chamber 11 by means of a level sensor 11*a* placed in the vacuum chamber 11 and by means of a top-up line, not illustrated, which feeds new liquid solution SL to be treated from an external tank into the loading conduit 51.

The liquid that evaporates is the vapour V which must be filtered and cleaned.

From the upper part 13 of the vacuum chamber 11, vapour V is sucked in by the extraction and compression means 30 and pushed towards the washing tower 20.

For example, if the liquid solution is at 60° C. in the lower part 12 of the vacuum chamber 11, the same liquid solution is heated to 70° C. inside the heat exchanger 41, and when it returns to the vacuum chamber 11 this superheated liquid solution returns to 60° C., releasing vapour V.

The vapour V is sucked in by the compressor, which compresses it and sends it to the washing tower 20 and from there back to the heat exchange means 15, i.e., inside the tank 40 so that it touches the outer surfaces of the heat exchanger 41.

The treated vapour V1 exiting the washing tower 20 condenses in the tank 40 and releases energy to the liquid solution SL circulating inside the heat exchanger 41.

The condensate, or distillate, i.e., the vapour that condenses in the tank 40, is extracted with a vacuum pump, and is collected for re-supply to the users.

The second transfer means 17 may include an auxiliary heater, not illustrated for simplicity purposes, placed at the delivery line 52, to heat the liquid solution SL before it enters the heat exchange means 15.

Such an auxiliary heater consists, for example, of an electrical resistance device, configured to surround the delivery conduit 52.

When the condensate, or 'distillate', is discharged from the tank 40, it is at a temperature of approximately 60° C.; for this reason, the discharge means 44 may comprise a recovery exchanger that crosses the liquid solution entering the vacuum evaporation unit 10; the incoming liquid solution SL heats up, while the condensate cools down.

Waste liquid solutions that are treated with a unit 10 according to the invention can be, for example and not exclusively, solutions of an oily emulsion, or solutions of water-based release agents, which may contain pollutants such as nitrogen in the form of ammoniacal nitrogen.

Inside the vacuum chamber 11 there is a pressure of approximately-0.8 bar.

All the low-boiling species distil, i.e., evaporate, together with the vapour formed in the evaporator.

As mentioned above, low-boiling species are gases that leave together with the vapour and are then found in the vapour condensate. They are therefore water-soluble gases.

Substances known to be 'insoluble' in water, e.g., CO2, or Nitrogen, are separated in the vacuum pump 45 of the discharge means 44 with which condensates are extracted from the tank 40, and are also referred to as 'non-condensables'.

The vacuum pump 45 has a tank that is called a 'non-condensable separator'; these gases that do not condense are released into the atmosphere, while soluble gases, such as the ammonium ion, or other low-boiling species, would re-condense in the condensate if they were not removed in the washing tower 20.

The vapours often contain low-boiling pollutants that go into the distillate.

Thanks to the washing tower 20, the vacuum evaporation unit 10 removes pollutants from the distillate so that the distillate can be used by the customer.

Thanks to the washing tower 20, and the specific absorption solution SA that is used, which is specific to the type of pollutant to be removed from the vapour V, the pollutant is concentrated inside the absorption solution SA, which becomes a substance that can have a practical application.

If, for example, the pollutant in the vapour V is the ammonium ion, then the absorption solution SA is an acid solution, e.g., sulphuric acid for the ammonium ion.

In this example, the final absorption solution, which collects in the settling basin 22, contains 30% ammonium sulphate and can be certified as a fertiliser.

This washing tower 20 works in a closed circuit and does not wash air, but washes vapour V.

The blowers 24*a* and 28*a* are atomisers/sprayers that spray the absorption solution SA, which then goes into enrichment and becomes enriched with the pollutant; in the above example, the solution SA, consisting of sulphuric acid as a starting point, is combined with the ammonium ion and becomes ammonium sulphate.

The ammonium sulphate falls back and is neutral, so to keep the pH of the absorption solution constant, new sulphuric acid is introduced into the absorption solution SA itself via the top-up pump 36, so that the absorption solution SA can always absorb the ammonium ion that arrives with the new vapour.

The treated vapour V1 is distilled without pollutant inside, or at least purified of 90% of the pollutant.

The settling basin 22 includes a discharge valve to evacuate the absorption solution SA when the same settling basin 22 is filled with neutralised solution and is no longer capable of capturing the pollutants present in the new vapour V entering the washing tower 20.

The water that is exported with the evacuated absorption solution SA is replenished with the new solution contained in the tank 38.

If the vapour V contains low-boiling solvents, the absorption solution SA contains solvent oils.

The vacuum evaporation unit 10 according to the invention allows the elimination of low-boiling pollutants in the vapour phase while realising the production of concentrated solutions that can be reused or directly delivered as residues, eliminating costly post-treatments.

Figure 5:
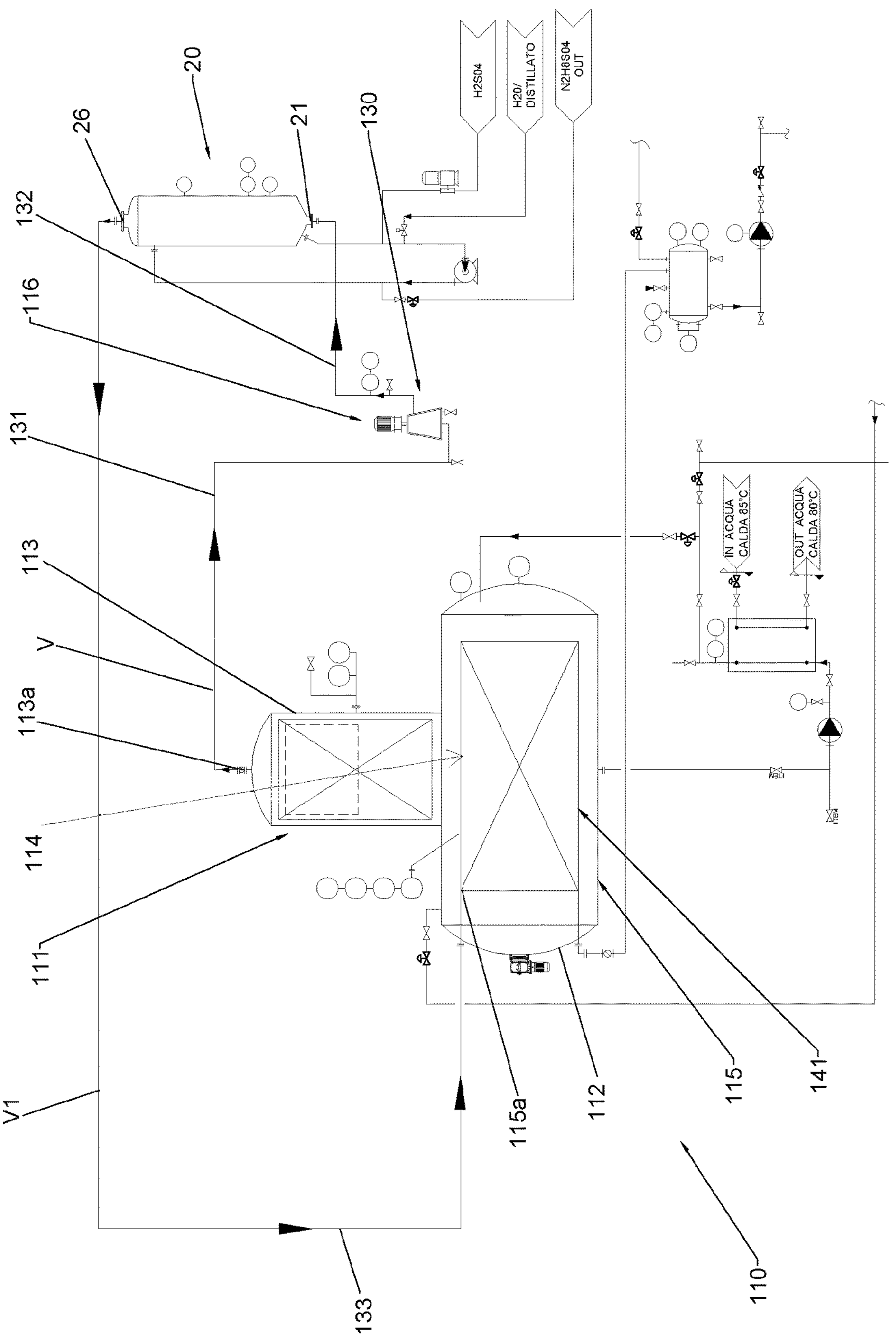
FIG. 5 represents an embodiment of an evaporation unit according to the invention.

A variant embodiment of a vacuum evaporation unit according to the invention is schematically illustrated in FIG. 5, and is referred to therein as 110.

This vacuum evaporation unit 110 comprises:

a vacuum chamber 111 for the containment of a liquid solution SL to be treated, comprising in turn a lower part 112 for collecting the liquid solution and an upper part 113 for a rising vapour V developing from said liquid solution;

a condensation chamber 114, where the condensation of vapour generated by the boiling of said liquid solution takes place;

heat exchange means 115 configured to bring about a heat exchange between said vapour V of said liquid solution SL and said liquid solution SL itself;

first transfer means 116 configured to conduct said vapour V from said upper part 113 of said vacuum chamber 111 towards said heat exchange means 115.

In this variant embodiment, the heat exchange means 115 are located inside the lower part 112 of the same vacuum chamber 111 and the condensation chamber 114 is defined by the same heat exchange means 115.

Specifically, a heat exchanger 141 is positioned inside the lower part 112 and is immersed in the liquid solution SL.

The first transfer means 116 comprise:

the extraction and compression means 130;

a first conduit 131 for the untreated vapour V, configured to connect a vapour outlet port 113*a* with a suction port of the extraction and compression means 130;

a second conduit 132 for the untreated vapour V, configured to connect the delivery port of the extraction and compression means 130 with the inlet port 21 of the washing tower 20;

the washing tower 20;

a third conduit 133 for the treated vapour V1, configured to connect the outlet port 26 of the washing tower 20 with an inlet port 115*a* of the heat exchange means 115.

Thus, in this variant embodiment, the treated vapour V1 flows into the heat exchanger 141 and not outside, as in the previously described variant embodiment, and inside the same heat exchanger 141 the treated vapour V1, as a result of the heat exchange with the liquid solution SL outside and present in this lower part 112, condenses and is then discharged externally. Thus, as mentioned above, the condensing chamber 114 is defined by the heat exchanger 141 itself.

Practically, it has been established that the invention achieves the intended task and objects.

In particular, the invention has developed a vacuum evaporation unit capable of breaking down low-boiling pollutants from the vapour phase.

In addition, the invention has developed a vacuum evaporation unit capable of recovering low-boiling species so that they are reusable.

In addition, the invention provides a vacuum evaporator unit that can incorporate any vacuum evaporator of the existing type.

The invention thus conceived is susceptible of numerous modifications and variations, all of which are within the scope of the inventive concept; moreover, all the details may be replaced by other technically equivalent elements.

In practice, the components and materials used, as long as they are compatible with the specific use, as well as the dimensions and the contingent shapes, may be any according to the requirements and the prior art.

If the characteristics and techniques mentioned in any claim are followed by reference signs, these reference signs are to be intended for the sole purpose of increasing the intelligibility of the claims and, consequently, such reference signs have no limiting effect on the interpretation of each element identified by way of example from these reference signs.

The invention claimed is:

1. A vacuum evaporation unit configured for treatment of a polluting liquid solutions, comprising:

a vacuum chamber for containment of a polluting liquid solution to be treated, the vacuum chamber comprising a lower part for collecting said liquid solution and an upper part for a rising vapour developing from said liquid solution;

a vacuum generator connected to said vacuum chamber;

a heat exchanger assembly configured to bring about a heat exchange between said vapour of said liquid solution and said liquid solution itself, said vacuum chamber and said heat exchanger assembly operatively communicating so that during use said liquid solution present in said lower part of said vacuum chamber is brought into contact with said heat exchanger assembly, said heat exchanger assembly comprising a tank within which a heat exchanger is arranged, at least one discharge port being formed on said tank through which condensate from a bottom of said tank can be extracted;

a condensation chamber communicating with said heat exchanger assembly, said condensation chamber being configured so that said vapour of said liquid solution condenses in said condensation chamber during use after said heat exchange with said liquid solution;

a first transfer assembly configured to conduct said vapour from said upper part of said vacuum chamber to said heat exchanger assembly;

a second transfer assembly configured to conduct said liquid solution from said lower part of said vacuum chamber to said heat exchanger assembly, said heat exchanger being connected at an inlet port with said second transfer assembly, and at an outlet with said upper part of said vacuum chamber;

wherein said first transfer assembly comprises:

a compressor;

a washing tower configured to house a liquid absorption solution;

a first conduit for said vapour, said first conduit connecting a vapour outlet port defined in said upper part of said vacuum chamber with a suction port of said compressor;

a second conduit for said vapour, said second conduit connecting a delivery port of said compressor with an inlet port of said washing tower;

said washing tower being configured for a countercurrent treatment of said vapour exiting from said vacuum chamber with said liquid absorption solution when disposed within said washing tower to produce a treated vapour;

a third conduit for said treated vapour treated with said washing tower, said third conduit connecting an outlet port of said washing tower with an inlet port of said tank of said heat exchanger assembly so that said treated vapour exiting said washing tower condenses in said tank of said heat exchanger assembly during use and releases energy to said liquid solution circulating inside said heat exchanger;

said washing tower further comprising:

a settling basin for a collection and settling of said liquid absorption solution;

an exchange column of a filling type configured to operate a countercurrent exchange of matter during use between said vapour, ascending within said washing tower, and said liquid absorption solution, descending within said washing tower, said exchange column being placed above said settling basin;

a dispenser configured to dispense said liquid absorption solution diffusely above said exchange column.

2. The vacuum evaporation unit according to claim 1, wherein said washing tower comprises a droplet separator placed above said dispenser.

3. The vacuum evaporation unit according to claim 2, wherein said washing tower comprises an auxiliary dispenser configured to dispense a liquid washing and replenishing solution diffusely above said droplet separator.

4. The vacuum evaporation unit according to claim 1, wherein said exchange column is filled with Raschig rings.

5. The vacuum evaporation unit according to claim 1, wherein said heat exchanger is connected to an intermediate zone of said vacuum chamber, above said lower part and below said vapour outlet port, by way of an outlet conduit.

6. The vacuum evaporation unit according to claim 1, further comprising a vacuum pump connected to said discharge port by way of a discharge conduit.

7. The vacuum evaporation unit according to claim 1, wherein said second transfer assembly comprise a circulation pump connected to said lower part of said vacuum chamber by a loading conduit and connected to said inlet port of said heat exchanger by a delivery conduit.

8. The vacuum evaporation unit according to claim 1, wherein said dispenser comprises a top-up pump configured to introduce into said absorption solution substances useful for re-establishing an established pH level.

* * * * *